United States Patent Office 3,272,020
Patented Sept. 13, 1966

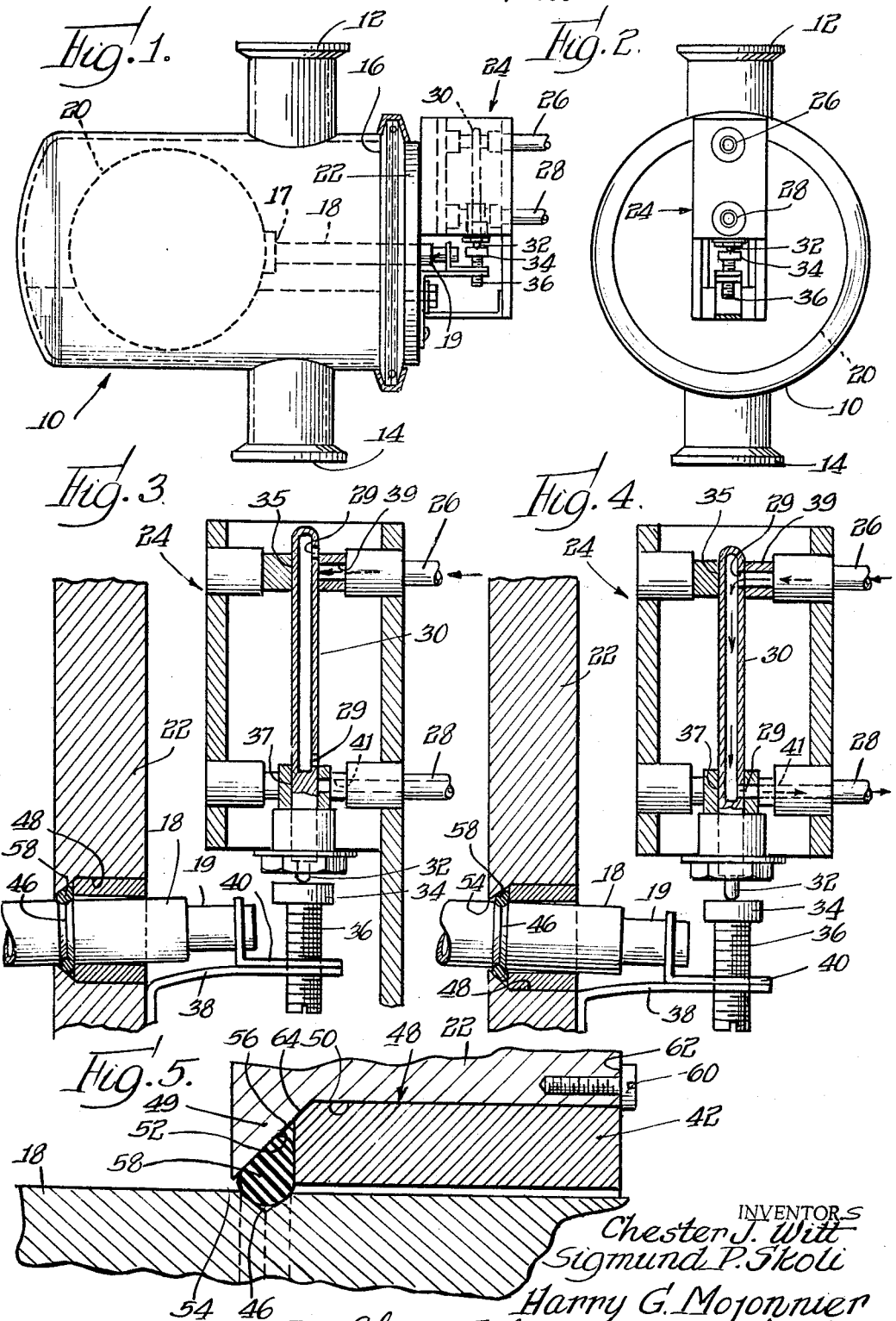

3,272,020
FLOAT OPERATED SIGNAL DEVICE
Chester J. Witt, Deerfield, Sigmund P. Skoli, Elmwood Park, and Harry G. Mojonnier, River Forest, Ill., assignors to Mojonnier Bros. Co., Chicago, Ill., a corporation of Illinois
Filed June 12, 1964, Ser. No. 374,684
4 Claims. (Cl. 74—18.1)

This invention relates generally to a float operated signal device for control of the level of fluid within a container. More particularly, the invention concerns a unique float assembly constructed especially for use in materials handling and proportioning of diverse fluids wherein a novel, foolproof device is incorporated for transmitting changes in the position of a float within a container holding a particular fluid to an external switch.

More specifically, this invention relates to a novel deceptively simple float operated signal device wherein an annulus is utilized functionally and structurally as a sanitary seal for fluids within a container and further as a pivotal support for a float rod transmitting a float level signal to a control device.

More broadly speaking, the invention relates to a unique float assembly incorporating a simple and low cost pivot assembly functioning simultaneously as a pivot or support for a float rod and as a vapor and liquid tight seal for fluids held within a chamber, the float assembly being suitable for heavy duty service and further being suitable for relatively inexpensive, trouble free vibrationless communication of a signal to an outer control device, the pivot assembly being exceptionally responsive to changes in or absolute level of fluids within a container and accurately communicating a signal to that effect to an external switch to actuate other mechanisms.

The problem

In the materials handling industry there has been a long standing need for an accurate highly responsive signal device for communication of changes in level of fluids within a container to an external control switch. Generally speaking, wherever fluids are handled in large quantities, control devices are required for accurately metering the fluids and communicating information regarding the fluid quantity or level to an external control apparatus.

For instance, in the baking industry accurate proportioning of the various fluids, that is, the water, milk, creams, liquid vitamins, and flavoring, is vital for maintaining the highest possible level of quality and for achieving uniformity from one batch to another. While separate containers may be provided for each of the many different liquids, experience has demonstrated that volume proportioning, utilizing an accurate and foolproof control device, is essential to assure use of the same amount of an ingredient each time.

One of the simplest and most widely accepted means for measuring liquid volume within a container is a conventional simple float device secured at one end of a float rod and maintained within a liquid container so that once the level of liquid within the container reaches a certain predetermined point, the float rises urging the float rod upwardly. The float rod may be pivoted centrally and thus when the float on the one end rises, the other end will be forced down; and in its simplest form, the downwardly moving other end of the float rod closes a valve stopping the flow of liquids to within the container.

While a simple level measuring device is acceptable where the requirements placed upon it are small, generally, wherever fluids are handled and metered in industry, much more sophisticated devices have been found necessary because of the great demands placed upon the device. Some of these demands have been due to the diverse nature of the fluids handled, that is, variations from materials which are relatively thick and viscous at normal room temperatures, such as molasses, to relatively thin smooth flowing liquids such as milk; to the thin highly evaporative liquids such as alcoholic beverages. Other demands have been due to the nature of the operation itself, for instance where exceptionally high volumes of liquids are handled in a unit of time, the measuring and control device must be both accurate and highly responsive. Thus some of the requirements placed upon a float operated liquid level signal device and control means, such as that with which the present invention is concerned, are that it must be capable of quickly and accurately measuring liquid level in a container over an extended period of heavy duty service, it must be highly responsive to changes in liquid level and yet must be substantially vibration free so that it does not respond to false changes in level or fast changes of level.

The device must be suitable for measuring the exact level of fluids within a container and must be capable of quickly and accurately communicating a signal to a control device whereby flow of fluids to within the container are stopped. Since the signal device with which the invention is concerned is inserted into a liquid container, sanitary means should be provided for sealing the liquids within the container without danger of evaporation or leakage. The device should be relatively simple from a functional viewpoint to avoid fluids being retained on the device and resulting in its clogging and malfunctioning. From a manufacturer's viewpoint, the signal device provided should be of a workable design, that is, one which is relatively simple to manufacture and preferably at a cost savings over other devices performing the same functions.

The objects of the invention

Thus, an object of this invention is to provide a novel improved float assembly to communicate a signal to an exterior control device when fluid level within a container has reached a predetermined position.

It is another object to provide a unique relatively foolproof float operated signal device in which a float rod extending into a fluid container is sealed to prevent the passage of fluids from the container.

Another object is to provide such a signal device in which a float rod is resiliently fulcrumed in a container to transmit a container fluid level signal to an exterior control device.

Still another object is to provide a novel low cost pivot assembly in a float operated signal device wherein a float rod is sealed and resiliently fulcrumed in a fluid container to prevent passage of fluids from the container consistent with exceptionally responsive communication of changes in fluid level within the container to an exterior control device.

These and other objects and advantages of the invention will be apparent from the following description taken in conjunction with the appended claims and drawings illustrating a preferred embodiment of the invention, wherein:

FIG. 1 is a side elevation view of the float assembly, that is, the float operated signal device of the invention, illustrating the assembly in association with a sanitary housing for fluids and an air pilot valve which cooperates with the float assembly in transmitting a signal to an external air controlled switch;

FIG. 2 is an end elevation view of the float assembly, sanitary housing and air pilot valve of FIG. 1;

FIGS. 3 and 4 are enlarged cut away side elevation views showing the unique pivot assembly of the signal device of FIG. 1 with a float rod shown in "up" position in FIG. 3 and in "down" position in FIG. 4;

FIG. 5 is an enlarged plan view of the pivot assembly of FIGS. 3 and 4.

*Detailed description of the invention*

Referring to the drawings, there is shown in FIG. 1 a sanitary housing or chamber 10 for fluids having an upper fluid inlet 12 and a lower fluid outlet 14, the housing having an end plate 16 with an opening therein for insertion of a float rod 18.

A float 20, FIGS. 1, 2, within the housing is seen to be buoyed to a certain extent by a level of fluid within the container; and is secured fixedly to one end 17 of the float rod 18, the other end 19 of the float rod extending through the end plate 16, and through a perforated mounting plate 22 secured to the end plate, the perforation of the mounting plate being in line with the end plate opening, and then into an air pilot valve assembly 24 secured to the rod mounting plate.

Air pilot valve assembly 24, FIGS. 3, 4, includes a hollow air inlet tube 26 and hollow air outlet tube 28 which is connected to a conventional air diaphragm valve, not shown, or other conventional air operated control device. Air inlet and outlet tubes 26, 28 are interconnected by a pilot valve 30 closed at its ends and having a lower pin 32 resting on the head 34 of an adjusting screw. Pilot valve 30 extends upwardly through a pair of openings 35 and 37 in tubes 26 and 28 and has a port 29 in its circumference in line with passageway 39, 41 in hollow tubing 26 and 28 so that when the pin 32 is in "down" position illustrated in FIG. 4, an air passageway through inlet tubing 26, valve 30 and outlet tubing 28 is open to permit a flow of air therethrough as indicated by the arrows.

When the pin 32 is moved into "up" position as illustrated in FIG. 3, the pilot valve 30 is also moved up and ports 29 are moved out of line with the tubing passageway, and a flow of air into inlet 26 is stopped by valve 30.

Adjusting screw 36, FIGS. 3, 4, is screwed through resilient spring bracket 38 which is secured to the mounting plate; and through float rod bracket or extension 40 fixedly attached to the end of float rod 18 so that when rod 18 is in "up" position, FIG. 3, the rod bracket 40, adjusting screw 36, and spring bracket 38 are urged upwardly and head 34 pushes upwardly against pin 32 to move air ports 29 out of alignment with inlet 26. The spring bracket 38 resiliently resists movement upwardly which requires bending or flexing of the spring bracket 38; and the bracket secures the float rod against movement horizontally inwardly or outwardly with respect to the rod mounting plate 22.

*The float rod pivotal support assembly*

Float rod 18 extending through the end of the housing is pivotally secured within the mounting plate, the support assembly for the rod being clearly shown in FIG. 5. The mounting plate 22 has a perforation or channel 48 adapted for receipt of the rod, a bushing 42 and a resilient annulus or O-ring 58 fitting around the rod within the channel. The O-ring 58 is advantageously positioned within a circumferential groove 46 which is provided in the rod 18, and is held in position in the groove by bushing 42. The inner surface of the channel 48 is seen to have a successively frusto-conically shaped shoulder 49 being generally V-shaped in cross section, and a generally cylindrical bushing receiving portion 50 of relatively greater inner diameter than the balance of the channel. The shoulder 49 has an inner surface 52 which is inclined in cross section at about a 45 degree angle to the cylindrical portion 50 ending in a rod receiving edge 54 of relatively smaller inner diameter than the balance of the channel.

Bushing 42 is secured to the mounting plate against movement axially of the channel axis and has an inner end portion 56 which fits up tightly against the shoulder 49 cooperating with shoulder and the rod groove 46 to tightly encompass the resilient annulus or O-ring 58. O-ring 58 effectively supports the float rod within the plate channel 48; serves as a precision fulcrum or pivot point for the float rod with the bushing compressing the O-ring in a direction axially of the rod permitting the rod to quickly and responsively communicate changes in fluid level to the exterior end of the float rod attached to rod bracket 40; and completely and effectively seals off the housing preventing the fluids from leaving the chamber, that is, it seals off the plate channel leading to the fluid chamber against leakage of liquids or vapors.

The means provided to secure the bushing to the mounting plate comprises a pair of threaded screws, seen in FIG. 5. The threaded screws 60 are inserted threadedly into the mounting plate in position extending generally horizontally inwardly, each of the screws having a head with a flat underside 62, a portion of which bears against the outer end of the bushing.

The screws are screwed into the mounting plate and rotated tightly against the bushing, urging the bushing firmly into position against the O-ring and the shoulder of the perforation. The bushing inner end 56 advantageously may have its peripheral edge 64 beveled inclinedly generally complementary to frusto-conically shaped shoulder of the perforation for a better fit against the shoulder and the O-ring.

*Operation of the invention*

For purposes of an easier understanding of the invention, it is advantageous to provide at this time a functional description of the mode in which the invention operates.

A conventional float secured to one end of a float rod is positioned within a conventional sanitary housing or fluid chamber to contain a fluid, the float rod extending through an end wall of the housing and being pivotally secured within a mounting plate fixedly and sealingly secured to the housing end wall for pivotal movement of the float rod upwardly and downwardly, responsive to the relative position of the float within the chamber, that is, the degree to which the float is buoyed by fluids within the housing.

The pivotal support assembly for the float includes advantageously a generally V-shaped groove in the periphery of the float rod for reception therein of an annulus of generally circular cross section, the mounting plate having a machined countersunk opening therein adapted for reception of the grooved rod, the annulus and a bushing positioned in the plate perforation adjacent the outer side of the face away from the fluid container or sanitary housing.

The mounting plate perforation is shaped advantageously frusto-conically to form an acutely V-angled shoulder to secure an annulus against movement axially inwardly toward the fluid container. The shoulder has a left hand portion comprising the inner side of the plate adjacent the container wall and a right hand portion which is frusto-conically shaped inwardly, the two portions forming the two faces of an acute V in cross section. Thus the right hand face of the V being the generally frusto-conically shaped portion leads to a generally cylindrical portion of the perforation for reception of the bushing.

The bushing is formed slightly oversize, that is its inner diameter encircling the float rod is slightly oversize, or is fraction of an inch larger than the float rod outer diameter, thus resulting in some play between the bushing and the rod and permitting movement of the float rod upwardly and downwardly.

The bushing has an inner end and an outer end, the inner end being nearest the container and having a beveled peripheral edge which is inclinedly beveled generally complementary to the mounting plate frusto-conically shaped portion, the bushing thus fitting tightly in position against at least a portion of the frusto-conically shaped portion and the cylindrical portion.

Means are provided advantageously to secure the bushing in position against movement horizontally, that is, movement axially with respect to the float rod outwardly from the container. The means provided comprises a pair of threaded screws each having a head with a substantially flat underside. The screws are inserted threadedly into the outer face of the mounting plate straddling the perforation in the plates with the flat head underside being positioned generally vertically and bearing against the bushing outer end to hold it in position.

Firmly held in position between the rod, the obtuse V of the mounting plate opening and one end of the bushing is a resilient annulus which is sufficiently large to seal off the chamber. The annulus fits supportingly around the float rod, acting as a fulcrum or pivot point for the float rod.

The annulus is formed advantageously of a resilient elastomeric material such as a silicone rubber material. Other materials of generally similar physical qualities may be used for this purpose if desired, keeping in mind that the material used should be relatively resilient to permit the annulus to function as a seal; the material used should have an acceptable resistance to attack by any fluid to be contained within the housing; and yet should be sufficiently hard to permit the annulus to function in combination with the mounting plate opening and its bushing as a pivot point for the float rod.

Since the annulus must function simultaneously as a seal and as a pivot point, it is formed slightly oversize whereby it is supported firmly by the bushing and perforated mounting plate to act as a pivot point; and it is slightly compressed tightly to seal the mounting plate opening, excluding the possibility of any crevices in the opening which might act as a trap for the accumulation of fluids which might hinder the responsiveness of the float rod.

The float rod has a rod extension arm mounted on its end being an extension of the float rod, the arm being attached at its far end, an L-shaped spring bracket which is fastened to the mounting plate, the bracket being attached to the arm by means of an adjusting screw extending threadedly through the extension arm and spring bracket.

The adjusting screw has a head which supports a lower end of an air pilot valve, which is a component part of an air pilot manifold attached to the perforated plate. The air pilot valve is attached to an air supply and is slidably adapted to be movable upwardly and downwardly responsive to the float movements, its movement being dependent on the positioning of the head of the adjusting screw and the movement upwardly and downwardly of the float rod and its extension arm.

The air pilot valve is adjusted to be out of alignment with the air supply when the float is not buoyantly supported so that no air flows through the valve and then through an air exit connectively leading away from the air valve to an air diaphragm valve or other conventional air operated control device; when the float is buoyed to a certain predetermined point, the rod extension arm moves pivotally downwardly about the annulus as a pivot, the head of the adjusting screw and its supported air pilot valve moves downwardly into alignment with an air inlet permitting air to flow from an air supply which supplies air under constant pressure to the air inlet through the pilot valve and from there through an air outlet connected to an air operated control device.

Thus operationally, a fluid is supplied to the fluid housing having the float and rod therein. As the fluid reaches a level of the float it begins to buoy the float upwardly urging the float pivotally upwardly about the annulus supporting the float rod. When the level of fluid reaches a predetermined level, the float rod extension arm is pivoted downwardly and a complete circuit for a flow of air is provided in an air pilot arrangement leading to an external control device. The air entering the control device actuates it; and it performs its predetermined function. For instance, the air operated control device may be set to shut off the flow of fluids into the fluid housing and to then seal off the fluid housing inlet; additionally it may cause the outlet of the fluid housing to be opened for a flow of the fluids gravitationally to a mixing chamber. These examples are, of course, merely illustrative and not limiting.

In view of the foregoing description, there has been provided herewith a novel float rod pivotal support arrangement, uniquely and deceptively suitable for exceptionally responsive reaction to the level of fluids within a container, simultaneously functioning as a highly effective heavy duty seal for fluids in the container, the rod being so supported and arranged as to be relatively vibration free to accurately communicate a fluid level signal to an outer control device.

Though the arrangement presented herein is at present considered to be preferred, it is to be understood that variations and modifications may be made therein; and it is intended to cover in the appended claims all such modifications as fall within the true spirit and scope of the invention.

The invention is hereby claimed as follows:

1. In a float-operated signal device, the combination comprising: a rod adapted to transmit the relative vertical position of a float member; an elastomeric element detachably surrounding said rod circumferentially in compressed engagement therewith whereby to act as both a seal for said rod and a pivot therefor; and a mounting structure for receiving said elastomeric element and preserving the compression thereof; said mounting structure including wall means perforated to pass said rod therethrough and having an annular surface confronting said elastomeric element at one side thereof and said mounting structure further including support means having a surface generally confronting said annular surface at the opposite side of said elastomeric element to provide a groove receiving said elastomeric element, said wall means at one side of said elastomeric element and said support means at the opposite side of said elastomeric element being spaced radially outwardly of said rod for clearance, said rod having groove means in mating relationship to the groove provided by said surfaces and in which the adjacent surface of said elastomeric element is disposed, and fastening means connected to said wall means for urging said surfaces toward each other and compressing said elastomeric element therebetween and into the groove means in said rod to seal the rod and support the same for permissive pivotal movement within said clearance while substantially preventing sliding and rotating movement of the rod.

2. The combination according to claim 1 wherein said surfaces have complemental mating portions.

3. The combination according to claim 1 wherein said annular surface is angled with respect to the transverse plane of said rod when said rod is disposed in its normal position.

4. The combination according to claim 1 wherein said elastomeric element is toroidal.

References Cited by the Examiner
UNITED STATES PATENTS

| | | | |
|---|---|---|---|
| 2,394,364 | 2/1946 | Christensen. | |
| 2,646,067 | 7/1953 | Smith | 137—434 X |
| 2,853,093 | 9/1958 | Kuhles | 137—413 X |
| 2,995,041 | 8/1961 | Rowan | 74—18 |
| 3,101,387 | 8/1963 | Mihran | 277—187 X |

WILLIAM F. O'DEA, *Primary Examiner.*

MARTIN P. SCHWADRON, ISADOR WEIL,
*Examiners.*

D. MATTHEWS, *Assistant Examiner.*